US006388045B1

(12) United States Patent
Ueno et al.

(10) Patent No.: US 6,388,045 B1
(45) Date of Patent: May 14, 2002

(54) LIQUID-CRYSTALLINE POLYMER

(75) Inventors: Ryuzo Ueno, Nishinomiya; Masaya Kitayama, Takarazuka; Kiichi Kometani, Ikeda; Taihei Hamasaki, Itami; Motoki Asahara, Hyogo-ken, all of (JP)

(73) Assignee: Kabushiki Kaisha Ueno Seiyaku Oyo Kenkyujo, Osaka (JP)

( * ) Notice: Subject to any disclaimer, the term of this patent is extended or adjusted under 35 U.S.C. 154(b) by 0 days.

(21) Appl. No.: 09/743,198

(22) PCT Filed: May 1, 2000

(86) PCT No.: PCT/JP00/02860

§ 371 Date: Jan. 8, 2001

§ 102(e) Date: Jan. 8, 2001

(87) PCT Pub. No.: WO00/68291

PCT Pub. Date: Nov. 16, 2000

(30) Foreign Application Priority Data

May 7, 1999  (JP) ............................ 11-127328

(51) Int. Cl.$^7$ .............................................. C08G 63/00
(52) U.S. Cl. .................... 528/190; 528/176; 528/191; 528/193; 528/194; 528/195; 528/206; 528/208; 528/210; 525/437; 524/81
(58) Field of Search ................ 528/176, 190, 528/191, 193, 194, 195, 206, 208, 210; 524/81; 525/437

(56) References Cited

U.S. PATENT DOCUMENTS 4,866,154 A  9/1989  Heitz et al. ................ 528/190

FOREIGN PATENT DOCUMENTS

JP  3-200830  9/1991

OTHER PUBLICATIONS

International Search Report.

Primary Examiner—Samuel A. Acquah
(74) Attorney, Agent, or Firm—Sughrue Mion, PLLC

(57) ABSTRACT

Provided is a liquid crystalline polymer which is obtained by copolymerizing at least one polyfunctional aromatic monomer selected from the group consisting of the compounds represented by the formulae (I), (II) and (III) below with at least one polymerizable monomer. The liquid crystalline polymer of the present invention is excellent in heat resistance, molding properties, flow properties and mechanical properties, especially it provide molded article with improved weld strength.

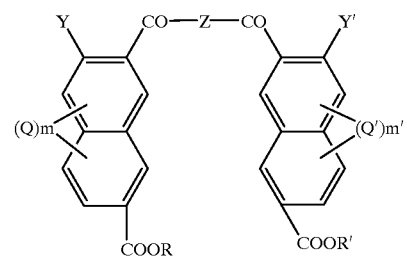

[I]

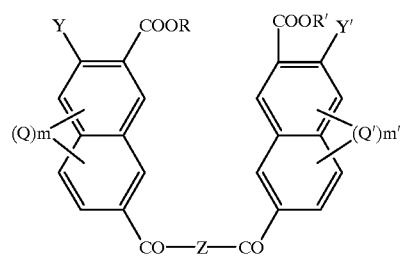

[II]

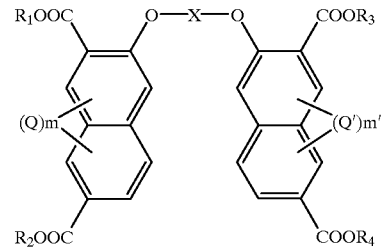

[III]

16 Claims, No Drawings

LIQUID-CRYSTALLINE POLYMER

TECHNICAL FIELD

The present invention relates to a liquid crystalline polymer, a liquid crystalline polymer composition and a molded article made of the same.

BACKGROUND ART

In these days, demands for high performance plastics are more and more increasing and novel polymers with a variety of functions have been developed. Among those plastics, liquid crystalline polymers which exhibit optical anisotropy have draw the attention because of their excellent mechanical properties. Especially, a liquid crystalline polymer consisting of aromatic polyester which is mainly made up of dominantly parahydroxy benzoic acid or derivatives thereof, is excellent in mechanical and electrical properties as well as in heat resistance and thermal stability, and said liquid crystalline polymer has been applied for a variety of products such as machine components, electric and electronic components, automobile parts and table wears.

The molecules of such liquid crystalline polymer as above are easily oriented with even slight shear strength such as occurred in the injection molding process.

Accordingly, there are some problems in a molded article, such as that difference of the mold shrinkage between in the machine direction (ME)) parallel to a material's flow in molding and the transverse direction (TD) to the MD, that has high anisotropy in mechanical strength, and that poor strength at the weldline when the article has a weldline.

In order to eliminate the anisotropy at molding, the arts have proposed various methods.

For example, Japanese Patent Publication (KOKOKU) No. 38007/1993 discloses a method for preparation of aromatic polyesters by polycondensing certain compounds, characterized in that compounds having polyfunctional groups such as 1,3,5-trihydroxy benzene, 3,5-dihydroxy benzoic acid, 5-hydroxy isophthalic acid or functional derivatives thereof are added to the reaction system. Japanese Patent Publication No. 38007/1993 teaches that 1,3,5-trihydroxy benzene and the others have less steric hindrance, are highly reactive and are the materials which can provide a polymer with good thermal stability, and that the aromatic polyester obtained by the method exhibits improved molding properties and less anisotropy.

In addition, Japanese Patent Application Laid Open (KOKAI) No, 331275/1993 discloses to improve the weld strength of the polyester resin by adding whisker consisting of needle-like titanium oxide or needle-like aluminum borate thereto.

However, the weld strength improvement effects in the liquid crystalline resins made by the methods as above were not enough and there were another problem that the flowability of the resin was much declined.

Accordingly, the object of the present invention is to dissolve the above-described problems and to provide a liquid crystalline polymer excellent in heat resistance, molding properties, flow properties and mechanical properties, especially to provide a liquid crystalline polymer which can provide a molded article with improved weld strength and less anisotropy in the molding properties.

The present inventors have studied intensively to dissolve the above problems and found that a liquid crystalline polymer made up of certain polyfunctional aromatic monomers can be used to provide a molded article with improved weld strength and less anisotropy.

DISCLOSURE OF INVENTION

The present invention provides a liquid crystalline polymer, that is a polymer suitable for melt processing, the main chains of the polymer are regularly aligned in parallel directions to give anisotropic melt phase. The polymer has an optically anisotropic property.

Accordingly, the present invention provide a liquid crystalline polymer which is obtained by copolymerizing at least one polyfunctional aromatic monomer selected from the group consisting of the compounds represented by the general formulae (I), (II) and (III) below:

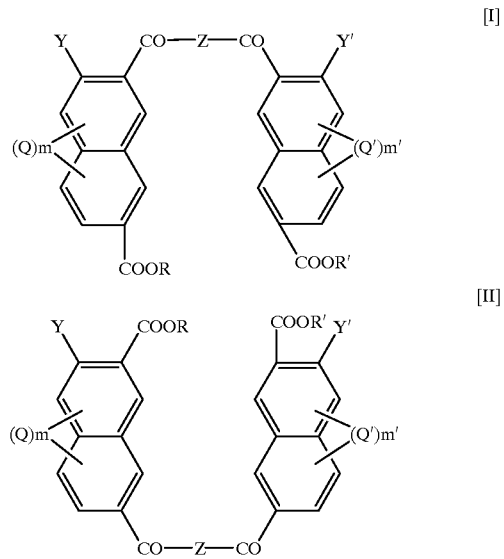

wherein Z represents —NH—A—NH— or —O—A'—O—, wherein A and A' is an optionally substituted hydrocarbon group of 1–20 carbon atoms which may have a heterocyclic moiety, or a heterocyclic group;

R and R' may be the same or different and represent a hydrogen atom or a hydrocarbon group of 1–20 carbon atoms;

Y and Y' may be the same or different and each represents a hydroxy group or a reactive derivative thereof;

Q and Q' each represents an optionally branched alkyl or alkoxy group of 1–6 carbon atoms, a halogen atom, a nitro group or a nitroso group; and m and m' each represents an integer of 0–3

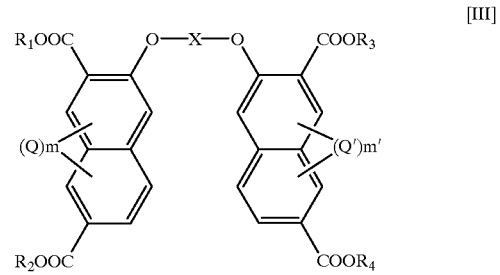

wherein X represents an optionally substituted hydrocarbon group of 1–20 carbon atoms which may have a heterocyclic moiety, or a heterocyclic group;

$R_1$, $R_2$, $R_3$ and $R_4$ may be the same or different and each represents a hydrogen atom or a hydrocarbon group of 1–20 carbon atoms;

Q and Q' each represents an optionally branched alkyl or alkoxy group of 1–6 carbon atoms, a halogen atom, a nitro group or a nitroso group; and m and m' each represents an integer of 0–3; with at least one polymerizable monomer.

In the present invention, examples of the hydrocarbon group of 1–20 carbon atoms in the definitions of A, A' and X include alkylene groups, alkenylene groups, and arylene groups such as phenylene and biphenylene groups.

Examples of the hydrocarbon group of 1–20 carbon atoms in the definition of R and R' include alkyl groups of 1–6 carbon atoms, especially methyl and ethyl groups, benzyl group, phenyl group and phenacyl group.

The reactive derivative of hydroxy group in the definition of Y and Y' may be any which can form an ester.

In the following illustration of the present invention, the at least one compound selected from polyfunctional aromatic monomers represented by the general formulae (I), (II) and (III) will be represented as ①.

The at least one polymerizable monomer used in the liquid crystalline polymer of the present invention may be any of the monomers used in conventional liquid crystalline polymers. Examples of the preferable monomers are those described in the ②–⑤ below.

②: at least one compound selected from aromatic dicarboxylic acids;

③: at least one compound selected from aromatic diols;

④: at least one compound selected from aromatic hydroxycarboxylic acids; and

⑤: at least one compound selected from the group consisting of aromatic hydroxyamines, aromatic diamines, aromatic aminocarboxylic acids.

In a preferred embodiment of the present invention, the liquid crystalline polymer of the present invention may be consisting of the combination of following A)–G):

A) a polyester consisting of ①, ② and ③;
B) a polyester consisting of ① and ④;
C) a polyester consisting of ①, ②, ③ and ④;
D) a polyester consisting of ①, ③ and ④;
E) a polyesteramide consisting of ①, ③, ④ and ⑤;
F) a polyesteramide consisting of ①, ②, ④ and ⑤; and
G) a polyesteramide consisting of ①, ②, ③, ④ and ⑤.

Further, the liquid crystalline polymer of the present invention may be the one obtained by copolymerizing the above described components with one or more compounds selected from the group consisting of an alicyclic dicarboxylic acid, an alicyclic diol, an aliphatic diol, an aromatic thiol carboxylic acid, an aromatic dithiol, and an aromatic thiol phenol.

Examples of the compounds suitable as monomers used for preparation of the liquid crystalline polymer of the present invention are described below.

The polyfunctional aromatic monomer of ① is the compound represented by the formulae (I), (II) or (III). Particularly, a compound obtained by crosslinking the 3rd position of a 2-hydroxynaphthalene-3,6-dicarboxylic acid derivative with ester and/or amide bondings, such as 1,4-bis(2'-hydroxy-6'-hydroxycarbonylnaphtho-3'-ylcarbonyl amino)phenylene, a compound obtained by crosslinking the 2nd position of a 2-hydroxynaphthalene-3,6-dicarboxylic acid derivative with ether bonding, such as 2,2'-hexylenedioxy-bis(3,6-dihydroxycarbonyl naphthalene), and a compound obtained by crosslinking the 6th position of a 2-hydroxynaphthalene-3,6-dicarboxylic acid derivative with ester and/or amide bondings such as 4,4'-bis(2"-hydroxy-3"-hydroxycarbonylnaphtho-6"-ylcarbonyl) biphenol.

As the at least one polymerizable monomer, the above described ②–⑤ compounds and oligomers obtained from one or more those monomers are preferably used.

Examples of the aromatic dicarboxylic acids of ② include aromatic dicarboxylic acids and alkyl, alkoxy or halogen substituted derivatives thereof such as terephthalic acid, chloro terephthalic acid, dichioro terephthalic acid, bromo terephthalic acid, methyl terephthalic acid, dimethyl terephthalic acid, ethyl terephthalic acid, methoxy terephthalic acid, ethoxy terephthaiic acid, isophthalic acid, naphthalene-2,6-dicarboxylic acid, naphthalene-1,6-dicarboxylic acid, naphthalene-2,7-dicarboxylic acid, biphenyl-4,4'-dicarboxylic acid, terphenyl-4,4"-dicarboxylic acid, diphenylether-4,4'-dicarboxylic acid, diphenoxybutane-4,4'-dicarboxylic acid, diphenylethane-4,4'-dicarboxylic acid, diphenylether-3,3'-dicarboxylic acid and diphenylethane-3,3'-dicarboxylic acid. Among the above, terephthalic acid, isophthalic acid, naphthalene-2,6-dicarboxylic acid and biphenyl-4,4'-dicarboxylic acid are preferable.

Examples of the aromatic diols of ③ include aromatic diols and alkyl, alkoxy or halogen substituted derivatives thereof, such as hydroquinone, chloro hydroquinone, methylhydroquinone, 1-butylhydroquinone, phenylhydroquinone, methoxyhydroquinone, phenoxy hydroquinone, 2,6-dihydroxynaphthalene, 2,7-dihydroxy naphthalene, 1,6-dihydroxynaphthalene, 4,4'-biphenol, 4,4"-dihydroxyterphenyl, 4,4'-dihydroxybiphenyl ether, 3,3'-dihydroxybiphenyl ether, bis(4-hydroxyphenoxy)ethane, 3,3'-biphenol, 2,2-bis(4-hydroxyphenyl)methane, resorcin, 4-chlororesorcin and 4-methylresorcin. Among the above, hydroquinone, methylhydroquinone, phenylhydroquinone, 2,6-dihydroxynaphthalene, 2,7-dihydroxynaphthalene and 4,4'-dihydroxybiphenyl are preferable.

Examples of the aromatic hydroxycarboxylic acid of ④ include aromatic hydroxycarboxylic acids and alkyl, alkoxy or halogen substituted derivatives thereof, such as 4-hydroxybenzoic acid, 3-methyl-4-hydroxybenzoic acid, 3,5-dimethyl-4-hydroxybenzoic acid, 2,6-dimethyl-4-hydroxy benzoic acid, 3-chloro-4-hydroxybenzoic acid, 2-chloro-4-hydroxybenzoic acid, 2,3-dichloro-4-hydroxybenzoic-acid, 3-bromo-4-hydroxybenzoic acid, 6-hydroxy-2-naphthoic acid, 6-hydroxy-5-methyl-2-naphthoic acid, 6-hydroxy-5-methoxy-2-naphthoic acid, 6-hydroxy-5-chloro-2-naphthoic acid, 6-hydroxy-7-chloro-2-naphthoic acid, 6-hydroxy-5,7-dichloro-2-naphthoic acid, 3-hydroxy-2-naphthoic acid and 2-hydroxy-3-naphthoic acid. Among the above, 4-hydroxy benzoic acid and 6-hydroxy-2-naphthoic acid are preferable.

Examples of the aromatic hydroxyamines, aromatic diamines, aromatic aminocarboxylic acids of ⑤ include 4-aminophenol, N-methyl-4-aminophenol, 3-aminophenol, 3-methyl-4-aminophenol, 4-amino-1-naphthol, 4-amino-4'-hydroxybiphenyl, 4-amino-4'-hydroxybiphenyl ether, 4-amino-4'-hydroxybiphenyl methane, 4-amino-4'-hydroxybiphenyl sulfide, 1,4-phenylenediamine, N-methyl-1,4-phenylenediamine, N,N'-dimethyl-1,4-phenylenediamine, 4,4'-diaminosulfide(thiodianiline), 4,4'-diaminobiphenyl sulfone, 2,5-diamino toluene, 4,4'-ethyienedianiline, 4,4'-diaminobiphenoxy ethane, 4,4'-diaminobiphenyl methane(methylene dianiline), 4,4'-diaminobiphenyl ether(oxydianiline), 4-aminobenzoic acid, 3-aminobenzoic acid, 6-amino-2-naphthoic acid, 7-amino-2-naphthoic acid. Among the above, 4-aminophenol, 1,4-phenylenediamine and 4-aminobenzoic acid are preferable.

The above polymers A)–G) comprising the above described components may include those give anisotropic melt phase and those do not, depending on components of the polymer and the ratio thereof, and the sequence distribution. The liquid crystalline polymer of the present invention covers only those give anisotropic melt phase.

The liquid crystalline polymer of the present invention may be prepared by copolymerizing the above component ① with at least one polymerizable monomer. The proportion of the at least one polyfunctional aromatic monomer selected from the group consisting of the compounds represented by the formulae (I), (II) and (III) (i.e. component ①) to the whole monomers consisting the polymer may be 0.01–5 mole %, preferably 0.01–2 mole %, more preferably 0.01–1 mole %.

In order to prepare the liquid crystalline polymer of the present invention, the polyfunctional aromatic monomer component ① may be added to the reaction mixture at the initial stage of the polymerization process; the polymerizable monomers such as ②–⑤ may be partially pre-polymerized before addition of the component ① and the whole may be polymerized together; or the component ① may be added successively to the mixture of polymerizable monomers while they are under the polymerizing stage before the reaction complete.

The polymerization may be conducted at a temperature of 200–400° C., preferably 250–350° C.

Examples of the combination of the components consisting of the preferable polymers of the present invention are as follows.

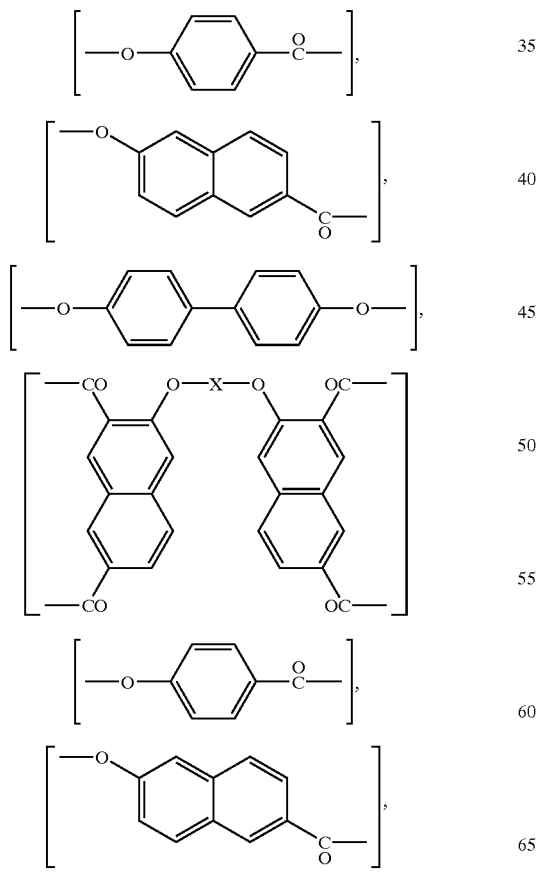

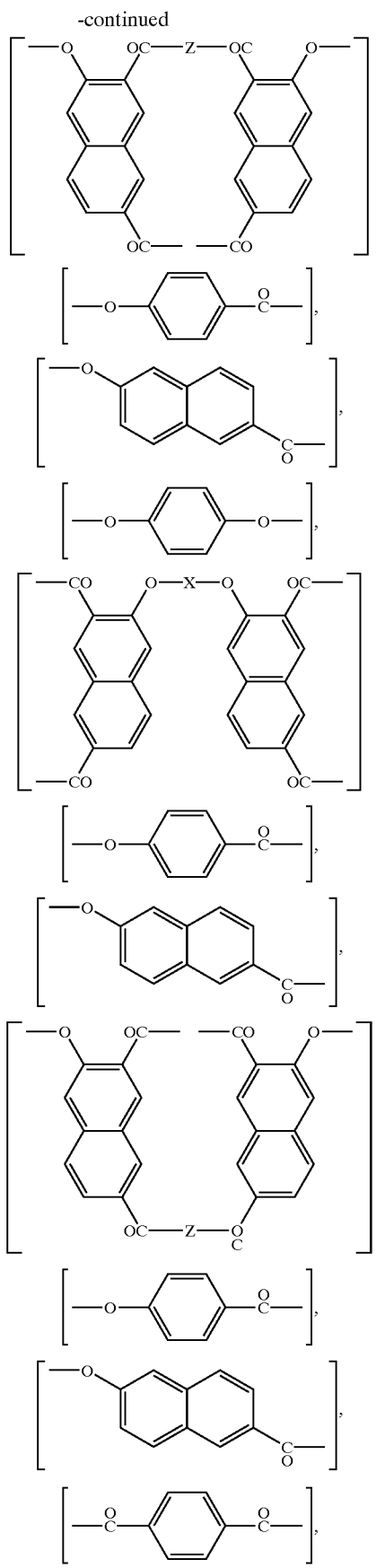

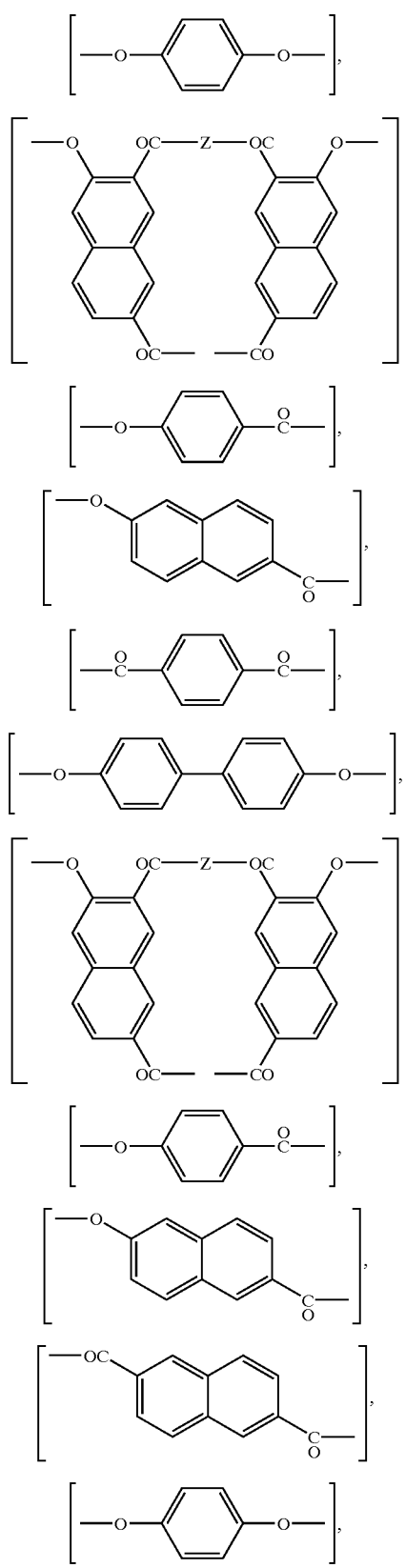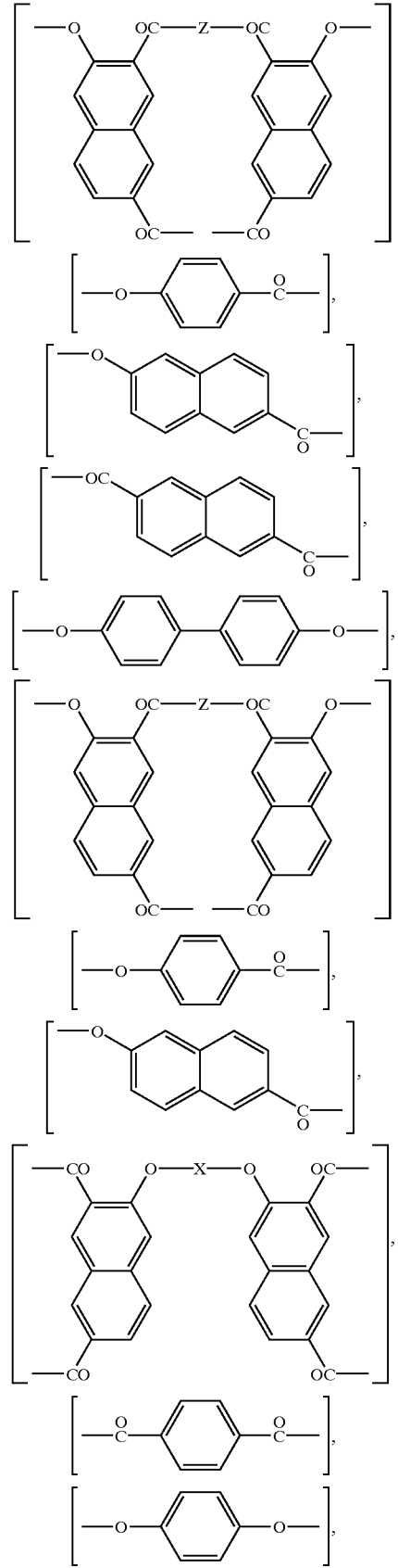

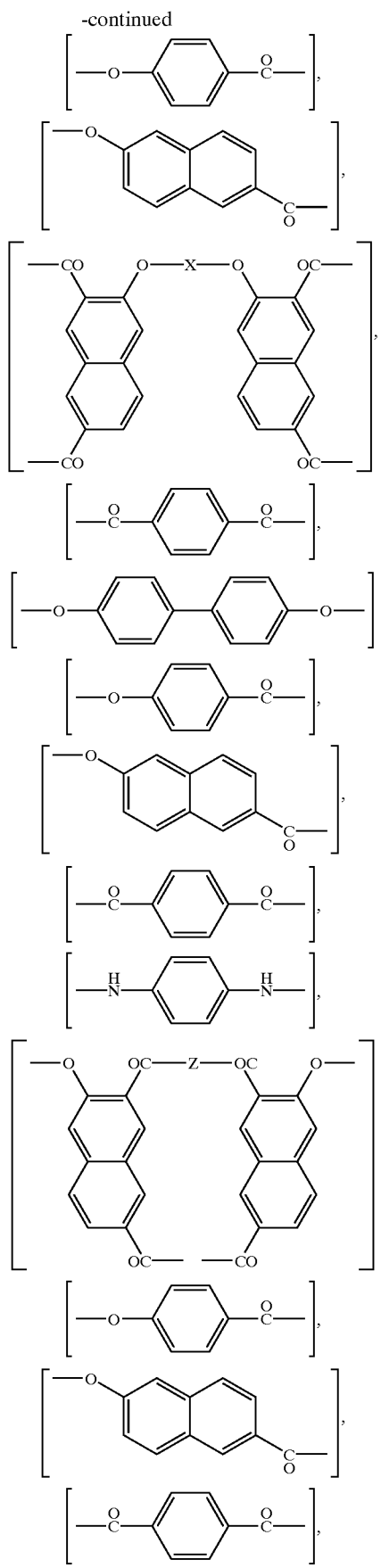

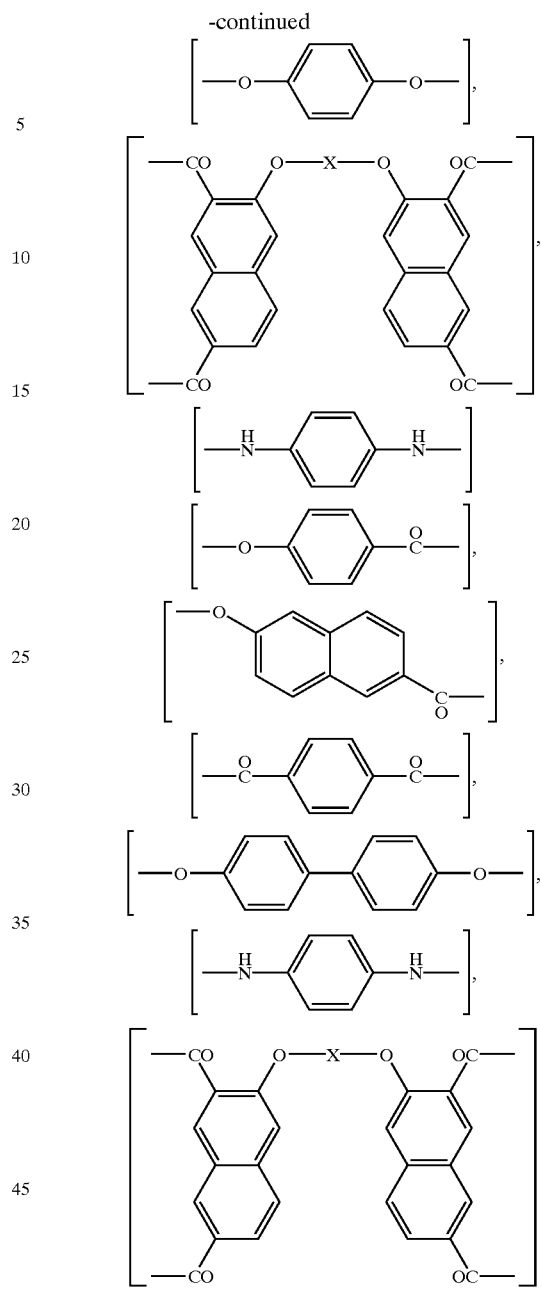

In the above formulae, Z represents —O—A'—O— and/or —NH—A—NH—, wherein A, A' and X each represents, for example, an alkylene group, a phenylene group and a biphenylene group.

Polyesters and polyesteramides of the present invention, i.e. the liquid crystalline polymers that give anisotropic melt phase can be prepared by a variety of ester and amide forming methods which enable to react organic monomers having functional groups which contribute to form the required repeating unit each other by condensation reaction. Examples of the functional groups of the organic monomers include carboxyl, hydroxy, ester, acyloxy halocarbonyl and amino groups. The above organic monomer compounds may be reacted by means of molten acidolysis method without the presence of heatexchange fluid. In this method, firstly monomers are heated together to give molten solution of the reactant. Upon the reaction proceeds, oligomer particles appear in the reaction media to give suspension. In order to facilitate the removal of volatile materials (ex. acetic acid or water) occurs at the final stage of the condensation reaction, the reaction may be carried out under vacuum.

In order to prepare the whole aromatic polymer useful for the present invention, the solid phase polymerization method may also be applied. In this method, the solid products may be polymerized as fine particles in a fluidized or still stood fashion, or may be polymerized by suspending in a heatexchange medium.

The organic monomer reactants, which provide the whole aromatic polymer, may be subjected to either the molten acidolysis or solid phase polymerization as modified compounds wherein the hydroxy groups of the monomers are esterified (i.e. as lower acyl esters) at an ambient temperature. The lower acyl group may have preferably 2–4 carbon atoms. In addition, acetates of said organic monomers are also preferably subjected to the reaction.

Examples of catalysts which may optionally be used in either the molten acidolysis process or the solid phase polymerization process include monoalkyl tin oxide (ex. monobutyl tin oxide), dialkyl tin oxide (ex. dibutyl tin oxide), diaryl tin oxide, titanium dioxide, antimony trioxide, alkoxy titanium silicate, titanium alkoxide, an alkaline or alkaline earth metal salt of an carboxylic acid (ex. zinc acetate), and gaseous acid catalysts such as a Lewis acid (ex. $BF_3$) and halogenated hydrogen (ex. HCl). The amount of the catalyst to be used may be 0.01–1 wt %, preferably 0.02–0.2 wt % of total amount of the monomers.

The liquid crystalline polymers of the present invention show a tendency that they are substantially insoluble to conventional solvents, and therefore, they are not suitable for the solution casting. However, as already mentioned above, those polymers are easily processed by means of a conventional melt molding. Some of the most preferable whole aromatic polymers exhibit some solubility in pentafluoro phenol.

The liquid crystalline polymers obtained according to the present invention may be admixed, if desired, with various reinforcing agents, fillers and stabilizers, and colorant to the extent that they do not impair the object of the present invention. The amount of the reinforcing materials and fillers to be added may be about 1–60 wt %. Examples of reinforcing materials, fillers and stabilizes, and colorant include glass fiber, carbon fiber, aramid fiber, silica, talc, mica, wollastonite, clay, aluminum borate whisker, potassium titanate whisker, glass flake, powdery quarts, sands, fumed silica, silicon carbide, aluminum oxide, tin oxide, iron oxide, zinc oxide, graphite, titanium dioxide and carbon black. In addition, the polymer may contain additives such as nucleating agent, anti oxidant, stabilizer, lubricant, releasing agent and flame retardant, to the extent that those additives do not deteriorate the object of the present invention.

The liquid crystalline polymer of the present invention may be subjected to a three-dimensional molding process, for example, injection molding, extrusion molding and blow molding, fiber spinning or film casting carried out under the condition where the cylinder temperature is above the liquid crystal state initiation temperature, preferably above the temperature of (liquid crystal state initiation temperature +10° C.) but below the point where the polymer is decomposed. Accordingly, the polymer may provide a molded article with good dimensional accuracy.

The present invention is further described in reference to the following Examples. The following examples are intended to illustrate the invention and are not to be construed to limit the scope of the invention.

Synthesis of Polyfunctional Aromatic Monomers

Polyfunctional aromatic monomers to be used in the examples were synthesized as follows.

SYNTHESIS EXAMPLE 1

1,4-bis(2'-Hydroxy-6'-hydrocycarbonylnaphtho-3'-ylcarbonyl Amino)phenylene

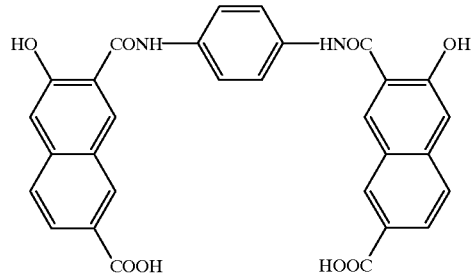

17.2 g of 2-hydroxy-6-hydroxycarbonyl-3-methoxycarbonyl naphthalene was almost dissolved in 150 g of tetrahydrofuran, and 0.05 g of N,N-dimethyl formamide and 16.7 g of thionyl chloride were added thereto and stirred for 3 hours at 50° C. Then, the solvent was distilled off together with the excess thionyl chloride, and a solution of 35.4 g of n-amyl alcohol in 200 g of tetrahydrofuran was added thereto and reacted for 15 hours at 70° C. The reaction mixture was concentrated and the residue was dispersed into 200 g of methanol and filtered to give pale yellow crystal. The crystal was suspended in 320 g of N N'-dimethyl formamide and 200 g of methanol, a solution of 28.7 g of sodium hydrogen carbonate in 450 g of water was added to the suspension and reacted for about 10 hours at 75° C. After the reaction completed, the pH of the reaction solution was adjusted to 2 with 10% aqueous HCl and the precipitated crystals were collected by filtration. Thus obtained 2-hydroxy-3-hydroxycarbonyl-6-n-pentyloxy carbonyl naphthalene was dried well and 12.7 g of the same was dissolved in 100 g of tetrahydrofuran. The solution was added with 0.1 g of N,N-dimethylformamide and 5.0 g of thionyl chloride and stirred for 2 hours at 50° C. Then, the solvent was distilled off together with the excess thionyl chloride, a solution of 1.4 g of p-phenylenediamine in 100 g of tetrahydrofuran was added to the residue and reacted for more than 20 hours under reflux. Then, the reaction was concentrated and the residue was dispersed into 200 g of methanol and filtered. The residue on the filter was dissolved in 100 g of N-methyl-2-pyrroridone at 70° C., cooled slowly to the room temperature and the precipitated crystals were collected by filtration. The precipitate was washed well with methanol and dried to give 2.9 g of brown crystal. The obtained brown crystal was added to a mixed solution of 10% aqueous NaOH (103.7 g) and methanol (68.4 g). The mixture was reacted under reflux for 6 hours, methanol was distilled off from the reaction mixture, the residue was added with 10% aqueous HCl to precipitate the crystal. The obtained crystals were filtered, washed with water and dried to give 1.0 g of powdery 1,4-bis(2'-hydroxy-6'-hydroxycarbonylnaphtho-3'-ylcarbonyl amino)phenylene (melting point, decomposition point: 369.7° C.).

SYNTHESIS EXAMPLE 2

2,2'-Hexylenedioxy-bis(3,6-dihydroxycarbonyl Naphthalene)

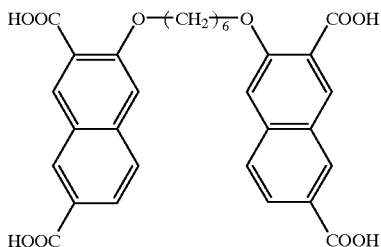

2.6 g of 2-hydroxy-3,6-dimethoxycarbonyl naphthalene was suspended in 30 g of N,N-dimethylformamide, 1.10 g of 1,6-dibromohexane, 2.1 g of potassium carbonate and 0.1 g of polyethylene glycol (average molecular weight 3000) were added thereto and reacted for 15 hours at 100° C. After that, the reaction suspension was poured into a mixed solution of 400 g of water and 100 g of methanol and the mixture was stood for about 1 hour before the precipitate was collected by filtration. The collected precipitate was washed well with methanol and water and dried to give 1.68 g of gray white powder 1.37 g of thus obtained gray white powder, i.e. 2,2'-hexylenedioxy-bis(3,6-methoxycarbonylnaphthalene), was suspended in 20 g of 1,4-dioxane, 1.0 g of sodium hydroxide and 20 g of water were added thereto and reacted under reflux for 2 hours. Then the reaction was cooled to the room temperature, added with 40 g of water and 10 g of active carbon, and stood for about 1hour before filtration. The filtrate was heated to 50–60° C., adjusted the pH to 2 with 10% aqueous HCl and stood to cool. The precipitated crystals were collected by filtration, washed well with 10% aqueous methanol and dried to give 1.05 g of gray white powder (decomposition point: 329° C.).

SYNTHESIS EXAMPLE 3

4,4'-bis(2"-Hydroxy-3"-hydroxycarbonylnaphtho-6"-ylcarbonyl)biphenol

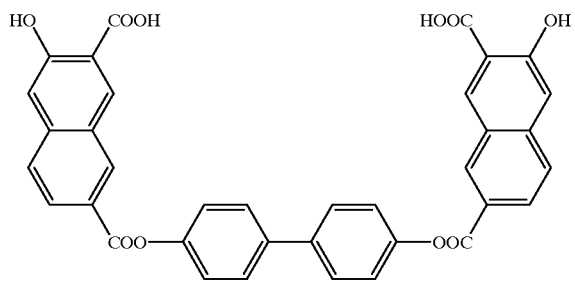

8.29 of 2-hydroxy-6-hydroxycarbonyl-3-methoxycarbonyl naphthalene was almost dissolved in 60g of tetrahydrofuran, 7.8 g of thionyl chloride was added thereto and stirred for 3 hours at 50° C. The solvent was distilled off together with the excess thionyl chloride, and a solution of 2.79 g of 4,4'-biphenol in 13 g of tetrahydrofuran and 3.5 g of N-methyl-2-pyrroridone was added to the residue and reacted for more than about 20 hours at 75° C. The insoluble matters were collected by filtration, washed well with methanol and dried to give 3.3 g of the object compound as a yellowish brown crystal. 3.3 g of thus obtained 4,4'-bis(2"-Hydroxy-3"-methoxycarbonylnaphtho-6"-ylcarbonylbiphenol was suspended in 200 g of methanol, 50 g of 24% aqueous NaOH was added thereto and-reacted for 6 hours at 50° C. After that, the reaction was added with 200 g of water, then was added dropwise with 100 g of 10% aqueous HCl, and the precipitated crystals were collected by filtration. The precipitates were washed well with methanol and water and dried to give 3.0 g of the object compound as yellowish brown crystal. (decomposition point: 346° C.).

SYNTHESIS EXAMPLE 4

Synthesis of 2,5-bis{4"-(2'-Hydroxy-6'-hydroxycarbonylnaphtho-3'-ylcarbonyl Amino) phenyl}-3,4-oxadiazole

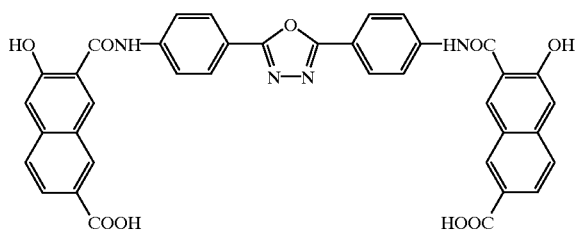

12.7 g of 2-hydroxy-3-hydroxycarbonyl-6-n-pentyloxycarbonyl naphthalene, which was obtained by a same manner as the Synthesis Example 1, was dissolved in 100 g of tetrahydrofuran, 0.1 g of N,N-dimethylformamide and 5.0 g of thionyl chloride were added thereto and stirred for about 15 hours at 60–70° C. Then, the solvent was distilled off together with the excess thionyl chloride and a solution of 2.9 g of 2,5-di(4'-aminophenyl)-3,4-oxadiazole in 100 g of tetrahydrofuran was added to the residue and reacted for more than 20 hours at 70–80° C. 200 g of methanol was added to the reaction and the precipitated crystals were collected by filtration. The precipitates were washed well with water and methanol, and dried to give 3.5 g of brown crystal. Thus obtained brown crystal was added to a mixed solution of 99.7 g of 10% aqueous NaOH and 65.8 g of methanol and reacted under reflux for 6 hours. Methanol was removed from the reaction and 10% aqueous HCl was added to the residual liquid to precipitate crystal. The crystals were collected by filtration, washed with water and dried to give 1.2 g of powdery 2,5-bis{4"-(2'-hydroxy-6'-hydroxycarbonyl naphtho-3'-ylcarbonyl aminophenyl)-3,4-oxadiazol (melting point, decomposition point: 375.9° C.)

SYNTHESIS EXAMPLE

Synthesis of 1,4-bis(2'-Acetoxy-6'-methoxycarbonylnaphtho-3'-ylcarbonyl Amino) phenylene

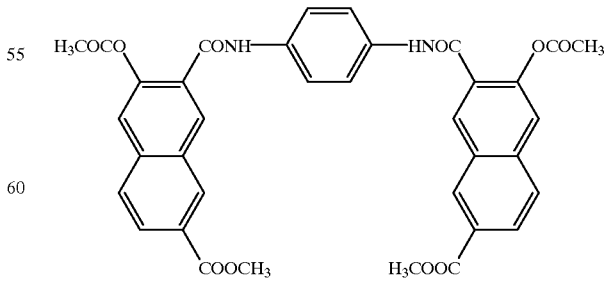

500 g of 2-hydroxy-3,6-hydroxycarbonyl naphthalene was almost dissolved in 3500 g of tetrahydrofuran, 0.4 g of N,N-dimethylformamide and 768 g of thionyl chloride were added thereto and stirred for 4 hours at 45° C. Then, the solvent was distilled off together with the excess thionyl chloride, 7000 g of methanol was added to the residue and reacted for 1 hour at 65° C. The reaction mixture was cooled to the room temperature and the precipitated crystals were collected by filtration. Thus obtained crystals were washed well with 50% aqueous methanol and dried. 260 g of thus obtained 2-hydroxy-3,6-methoxycarbonyl naphthalene was dissolved in 2340 g of N,N-dimethylformamide and 2340 g of methanol, an aqueous solution of 168 g of sodium hydrogen carbonate in 2400 g of water was added thereto and reacted for about 7 hours at 75° C. After the reaction was completed, the pH of the reaction was adjusted to 3 with 10% aqueous HCl and the precipitated crystals were collected by filtration. Thus obtained 395 g of 2-hydroxy-3-hydroxycarbonyl-6-methoxycarbonyl naphthalene was dissolved in 1800 g of N,N-dimethylformamide, 961 g of acetic acid, 817 g of acetic anhydride and 4 g of 4-dimethylamino pyridine were added thereto and reacted for about 2 hours at 80° C. The reaction was cooled to the room temperature and was poured into 6L of water. The precipitated crystals were collected by filtration and dried. 450 g of thus obtained 2-acetoxy-3-hydroxycarbonyl-6-methoxycarbonyl naphthalene was dissolved in tetrahydrofuran, 0.3 g of N,N-dimethylformamide and 278.5 g of thionyl chloride were added thereto, and stirred for 2 hours at 50° C. Then, the solvent was distilled off together with the excess thionyl chloride and the residue was suspended in 1350 g of tetrahydrofuran, and a solution of 80 g of p-phenylenediamine in 1350 g of tetrahydrofuran was added thereto and reacted for 15 hours at 65° C. The reaction was cooled to the room temperature, the precipitated crystals were collected by filtration and washed well with methanol and then water to give crude compound. 195 g of the crude compound was recrystallized from N,N-dimethylformamide to give the object compound, 1,4-bis(2'-acetoxy-6'-methoxycarbonyl naphtho-3'-ylcarbonyl amino)phenylene (melting point, decomposition point: 264° C.).

EXAMPLE 1

The following compounds were fed in a reaction container equipped with an agitating blade and a condenser, and the deacetic acid polycondensation reaction was carried out by the following condition.

p-hydroxy benzoic acid: 655 parts by weight (73.4 mole %)

6-hydroxy-2-naphthoic acid: 318 parts by weight (26.1 mole %)

1.4-bis(2'-hydroxy-6'-hydroxycarbonyl naphtho-3'-ylcarbonyl amino)phenylene: 17 parts by weight (0.5 mole %)

acetic anhydride: 688 parts by weight potassium acetate: 0.07 parts by weight

Under the nitrogen atmosphere, the mixture was heated from 40° C. to 190° C. over 3 hours, kept at 190° C. for 1 hour, heated to 325° C. over 2 hours and 20 minutes, reacted at 325° C. for 10 minutes, and then reduced the pressure to 20 mmHg over 20 minutes at 325° C. and reacted for further 5 minutes to complete the polycondensation reaction. Approximately theoretical amount of acetic acid was distilled out and a resin with the following theoretical structural formula was obtained:

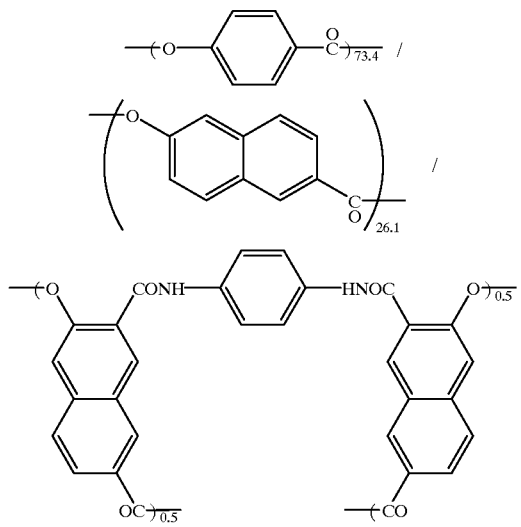

The obtained polyester was dissolved in pentafluorophenol to give 0.1 wt % polymer solution. The time required for free fall of the polymer solution in the capillary tube of Ubbellohde viscometer was measured in a 60° C. thermostat bath. The intrinsic viscosity η was determined by the following formula and η=7.7 was obtained, $$\eta = \ln\frac{\text{time for free fall of the polymer solution(s)}}{\text{time for free fall of the solvent(s)}} \div$$

concentration of the polymer solution(wt %)

The melting point of the obtained resin was 283° C.

The resin obtained as a above was crushed and subjected to the injection molding with an injection molding machine MINIMAT 26/15 (Sumitomo Heavy Industries, Ltd.) (cylinder temperature. 300-300-290-280° C., mold temperature: 70° C.) to give dumbbell specimens (whole length: 64 mm, linear portion length: 12 mm, linear portion width: 3.4 mm, thickness: 1.5 mm) and flexural test strips of 12.7×64× 2.0 (mm). Two types of dumbbell specimens were molded using a conventional mold having one gate at the end and a weldline type mold having two gates at the both ends, and measured tensile strength of the each to calculate the retention of weldline tensile strength.

Further, the flexural test strips was cut from the center part in the machine direction (hereinafter, MD), and also in the transverse direction (hereinafter, TD), and the linear expansion coefficient at 23° C.–200° C. of the TD and MD directions were measured with EXSTRA 6000 (SEIKO DENSHI KOGYO Ltd.). The results are shown in Table 1.

EXAMPLE 2

The following compounds were fed in a reaction container equipped with an agitating blade and a condenser, and polycondensation and mold were conducted in the same manner as Example 1. The weld strength and the anisotropy in linear expansion coefficient of TD and MD directions were evaluated on the test specimens. The obtained results as well as the intrinsic viscosity η and the melting point of the resin are shown in table 1.

p-hydroxy benzoic acid: 655 parts by weight (72.6 mole %)

6-hydroxy-2-naphthoic acid: 318 parts by weight (25.9 mole %)

2,2'-hexylenedioxy-bis(3,6-dihydroxycarbonyl naphthalene): 18 parts by weight (0.5 mole %)

4,4'-biphenol: 12 parts by weight (1.0 mole %)
acetic anhydride: 695 parts by weight
potassium acetate: 0.07 parts by weight

EXAMPLE 3

The following compounds were fed in a reaction container equipped with an agitating blade and a condenser, and polycondensation and mold were conducted in the same manner as Example 1. The weld strength and the anisotropy in linear expansion coefficient of TD and MD directions were evaluated on the test specimens. The obtained results as well as the intrinsic viscosity η and the melting point of the resin are shown in table 1.

p-hydroxy benzoic acid: 655 parts by weight (73.4 mole %)

6-hydroxy-2-naphthoic acid: 318 parts by weight (26.1 mole %)

4,4'-bis(2"-hydroxy-3"-hydroxycarbonyl naphto-6"-ylcarbonyl)biphenol: 20 parts by weight (0.5 mole %)

acetic anhydride: 688 parts by weight potassium acetate: 0.07 parts by weight

EXAMPLE 4

The following compounds were fed in a reaction container equipped with an agitating blade and a condenser, and polycondensation and mold were conducted in the same manner as Example 1. The weld strength and the anisotropy in linear expansion coefficient of TD and MD directions were evaluated on the test specimens. The obtained results as well as the intrinsic viscosity η and the melting point of the resin are shown in table 1.

p-hydroxy benzoic acid: 655 parts by weight (73.4 mole %)

6-hydroxy-2-naphthoic acid: 318 parts by weight (26.1 mole %)

2,5-bis{4"-(2'-hydroxy-6'-hydroxycarbonylnaphtho-3'-ylcarbonylamino)phenyl}-3,4-oxadiazole: 21.5 parts by weight (0.5 mole %)

acetic anhydride: 688 parts by weight potassium acetate: 0.07 parts by weight

EXAMPLE 5

The following compounds were fed in a reaction container equipped with an agitating blade and a condenser, and polycondensation and mold were conducted in the same manner as Example 1. The weld strength and the anisotropy in linear expansion coefficient of TD and MD directions were evaluated on the test specimens. The obtained results as well as the intrinsic viscosity 9 and the melting point of the resin are shown in table 1.

p-hydroxy benzoic acid: 655 parts by weight (73.4 mole %)

6-hydroxy-2-naphthoic acid: 318 parts by weight (26.1 mole %) 1,4-bis(2'-acetoxy-6'-methoxycarbonyl naphto-3'-ylcarbonylamino)phenylene: 17.9 parts by weight (0.5 mole %)

acetic anhydride: 688 parts by weight potassium acetate: 0.07 parts by weight antimony trioxide: 0.18 parts by weight

COMPARATIVE EXAMPLE 1 (without the polyfunctional aromatic monomer)

The following compounds were fed in a reaction container equipped with an agitating blade and a condenser, and polycondensation and mold were conducted in the same manner as Example 1. The weldline strength and anisotropy in linear expansion coefficient of TD and MD directions were evaluated on the test specimens. The obtained results and the intrinsic viscosity η and the melting point of the resin are shown in table 1.

p-hydroxy benzoic acid: 655 parts by weight (73 mole %)

6-hydroxy-2-naphthoic acid: 318 parts by weight (27 mole %)

acetic anhydride: 688 parts by weight potassium acetate: 0.07 parts by weight

COMPARATIVE EXAMPLE 2 (pyromelletic acid was used)

The following compounds were fed in a reaction container equipped with an agitation blade and a condenser, and polycondensation and mold were conducted in the same manner as Example 1. The weld strength and anisotropy in linear expansion coefficient of TD and MD directions were evaluated on the test specimens. The obtained results and the intrinsic viscosity η and the melting point of the resin are shown in table 1.

p-hydroxy benzoic acid: 646 parts by weight (72.6 mole %)

6-hydroxy-2-naphthoic acid: 330 parts by weight (25.9 mole %)

pyromelletic acid: 8.3 parts by weight (0.5 mole %)

4,4'-biphenol: 12 parts by weight (1.0 mole %)

acetic anhydride: 695 parts by weight potassium acetate: 0.07 parts by weight

TABLE 1

| | melting point (° C.) | η | tensile strength (kg/cm$^2$) | weldline tensile strength (kg/cm$^2$) | retention of weldline strength (%) | linear expansion coefficient | | |
|---|---|---|---|---|---|---|---|---|
| | | | | | | TD direction | MD direction | TD/MD |
| Ex. 1 | 283 | 7.7 | 2700 | 864 | 32.0 | $4.7 \times 10^{-5}$ | $1.3 \times 10^{-5}$ | 3.6 |
| Ex. 2 | 280 | 8.1 | 2670 | 761 | 28.5 | $5.1 \times 10^{-5}$ | $1.5 \times 10^{-5}$ | 3.4 |
| Ex. 3 | 279 | 8.0 | 2600 | 806 | 31.0 | $5.2 \times 10^{-5}$ | $1.3 \times 10^{-5}$ | 4.0 |
| Ex. 4 | 284 | 7.6 | 2710 | 850 | 31.0 | $4.5 \times 10^{-5}$ | $1.3 \times 10^{-5}$ | 3.5 |
| Ex. 5 | 282 | 7.5 | 2670 | 855 | 32.0 | $4.9 \times 10^{-5}$ | $1.2 \times 10^{-5}$ | 4.1 |
| Comp. Ex. 1 | 284 | 8.0 | 2750 | 124 | 4.5 | $6.0 \times 10^{-5}$ | $0.2 \times 10^{-5}$ | 30 |
| Comp. Ex. 2 | 281 | 7.5 | 1950 | 166 | 8.5 | $5.7 \times 10^{-5}$ | $0.5 \times 10^{-5}$ | 10.2 |

Based on the results shown in table 1, the thermotropic liquid crystalline polymer of the present invention copolymerized with a polyfunctional aromatic monomer therein exhibit improved weldline strength at the thin portion and reduced anisotropy of the linear expansion coefficient while kept the good tensile strength compared with comparative example 1, without the polyfunctional aromatic monomer. The polymer system of the present invention is far more effective than those incorporated pyromelletic acid therein.

INDUSTRIAL APPLICABILITY

The liquid crystalline polymers of the present invention are excellent in heat-resistance, moldability and flow properties, and can provide a molded article with good mechanical properties, especially an improved weldline strength and reduced anisotropy in the properties of the molded article.

The liquid crystalline polymer, liquid crystalline polymer composition and the article prepared therefrom can be applied for a variety of products such as machine components, electric and electronic components, automobile parts and table wears.

What is claimed is:

1. A liquid crystalline polymer which is obtainable by copolymerizing at least one polyfunctional aromatic monomer selected from the group consisting of the compounds represented by the general formulae (I), (II) and (III) below:

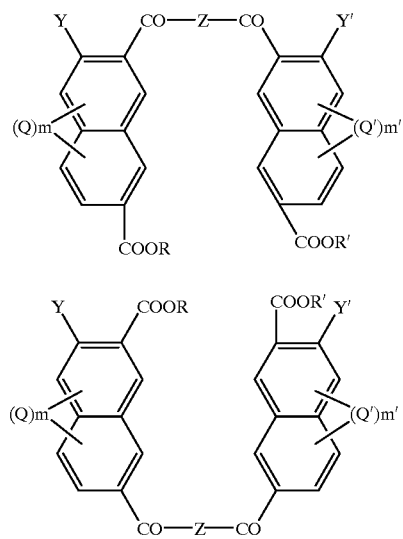

wherein Z represents —NH—A—NH— or —O—A'—O—, wherein A and A' is an optionally substituted hydrocarbon group of 1–20 carbon atoms which may have a heterocyclic moiety, or a heterocyclic group;

R and R' may be the same or different and represent a hydrogen atom or a hydrocarbon group of 1–20 carbon atoms;

Y and Y' may be the same or different and each represents a hydroxy group or a reactive derivative thereof;

Q and Q' each represents an optionally branched alkyl or alkoxy group of 1–6 carbon atoms, a halogen atom, a nitro group or a nitroso group; and m and m' each represents an integer of 0–3

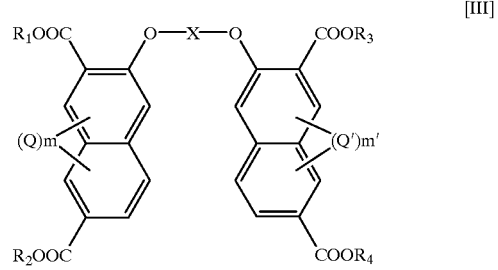

wherein X represents an optionally substituted hydrocarbon group of 1–20 carbon atoms which may have a heterocyclic moiety, or a heterocyclic group;

$R_1$, $R_2$, $R_3$ and $R_4$ may be the same or different and each represents a hydrogen atom or a hydrocarbon group of 1–20 carbon atoms;

Q and Q' each represents an optionally branched alkyl or alkoxy group of 1–6 carbon atoms, a halogen atom, a nitro group or a nitroso group; and m and m' each represents an integer of 0–3; with at least one polymerizable monomer.

2. The liquid crystalline polymer of claim 1, wherein the proportion of the at least one polyfunctional aromatic monomer selected from the group consisting of the compounds represented by the formulae (I), (II) and (III) to the whole monomers consisting the polymer is 0.01–5 mole %.

3. The liquid crystalline polymer of claim 1 wherein the polyfunctional aromatic monomer is the compound represented by the formula (I):

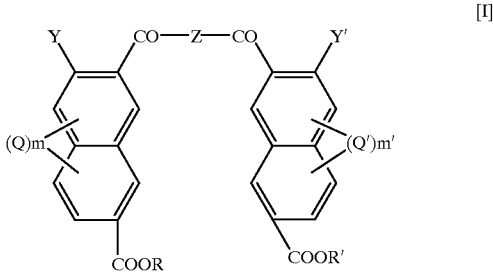

wherein Z, Y, Y', R, R', Q, Q', m, and m' represent the same as above.

4. The liquid crystalline polymer of claim 1 wherein the polyfunctional aromatic monomer is the compound represented by the formula (II):

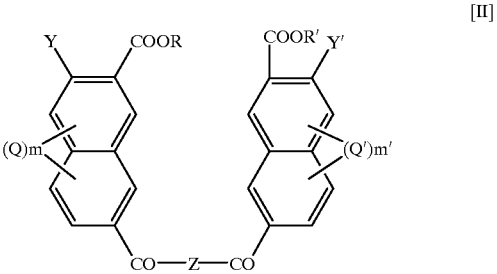

wherein Z, Y, Y', R, R', Q, Q', m, and m' represent the same as above.

5. The liquid crystalline polymer of claim 1 wherein the polyfunctional aromatic monomer is the compound represented by the formula (III):

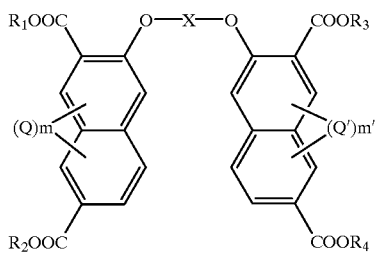

wherein Z, Y, Y', R, R', Q, Q', m, and m' represent the same as above.

6. The liquid crystalline polymer of claim 1 wherein the at least one polymerizable monomer comprises at least one compound selected from the group consisting of an aromatic dicarboxylic acid, an aromatic diol, a hydroxycarboxylic acid, aromatic hydroxyamine, an aromatic diamine, and an aromatic aminocarboxylic acid.

7. The liquid crystalline polymer of claim 6, wherein the at least one polymerizable monomer comprises at least one aromatic dicarboxylic acid and at least one aromatic diol.

8. The liquid crystalline polymer of claim 6, wherein the at least one polymerizable monomer comprises at least one aromatic hydroxycarboxylic acid.

9. The liquid crystalline polymer of claim 6, wherein the at least one polymerizable monomer comprises at least one aromatic dicarboxylic acid, at least one aromatic diol, and at least one aromatic hydroxycarboxylic acid.

10. The liquid crystalline polymer of claim 6, wherein the at least one polymerizable monomer comprises at least one aromatic diol, and at least one aromatic hydroxycarboxylic acid.

11. The liquid crystalline polymer of claim 6, wherein the at least one polymerizable monomer comprises at least one aromatic diol, at least one aromatic hydroxycarboxylic acid, and at least one compound selected from the group consisting of aromatic hydroxy amine, aromatic diamine and aromatic aminocarboxylic acid.

12. The liquid crystalline polymer of claim 6, wherein the at least one polymerizable monomer comprises at least one aromatic dicarboxylic acid, at least one aromatic hydroxycarboxylic acid, and at least one compound selected from the group consisting of aromatic hydroxy amine, aromatic diamine and aromatic aminocarboxylic acid.

13. The liquid crystalline polymer of claim 6, wherein the at least one polymerizable monomer comprises at least one aromatic dicarboxylic acid, at least one aromatic diol, at least one aromatic hydroxycarboxylic acid, and at least one compound selected from the group consisting of aromatic hydroxy amine, aromatic diamine and aromatic aminocarboxylic acid.

14. A liquid crystalline polymer composition comprising the liquid crystalline polymer of claim 1 and reinforcing agent and/or fillers.

15. A molded article, which is obtained by melt molding of the liquid crystalline polymer of claim 1.

16. A molded article, which is obtained by melt molding of the liquid crystalline polymer composition of claim 14.

* * * * *